United States Patent
Peric et al.

(10) Patent No.: US 7,318,451 B2
(45) Date of Patent: Jan. 15, 2008

(54) FLAPPER VALVES WITH SPRING TABS

(75) Inventors: Yuri Peric, Oakville (CA); Brian Ernest Duke, Carlisle (CA)

(73) Assignee: Dana Canada Corporation, Oakville, Ontario (CA)

( * ) Notice: Subject to any disclaimer, the term of this patent is extended or adjusted under 35 U.S.C. 154(b) by 0 days.

(21) Appl. No.: 11/110,410

(22) Filed: Apr. 20, 2005

(65) Prior Publication Data

US 2006/0237183 A1 Oct. 26, 2006

(51) Int. Cl.
*F16K 15/16* (2006.01)

(52) U.S. Cl. ............... 137/855; 165/280; 165/284; 165/916

(58) Field of Classification Search ............ 165/280, 165/283–284, 297, 916, 167; 137/15.18, 137/15.19, 855–858, 454.2
See application file for complete search history.

(56) References Cited

U.S. PATENT DOCUMENTS

| | | |
|---|---|---|
| 1,690,501 A | 11/1928 | Potts |
| 1,860,163 A | 5/1932 | Wyzenbeek |
| 2,698,063 A | 12/1954 | Brubaker |
| 2,826,448 A | 3/1958 | Jones |
| 3,289,693 A * | 12/1966 | Scaramucci ........ 137/858 |
| 3,568,712 A | 3/1971 | Rinehart |
| 3,621,868 A | 11/1971 | Wise |
| 3,949,716 A | 4/1976 | Liu |
| 3,990,604 A | 11/1976 | Barnett et al. |
| 3,998,243 A | 12/1976 | Osterkorn et al. |
| 3,998,571 A | 12/1976 | Falke |
| 4,179,051 A | 12/1979 | Thomas |
| 4,193,442 A | 3/1980 | Vian |
| 4,199,309 A * | 4/1980 | Connor ........ 418/270 |
| 4,337,737 A | 7/1982 | Pechner |
| 4,360,055 A | 11/1982 | Frost |
| 4,373,561 A | 2/1983 | Berger |
| 4,425,067 A | 1/1984 | Krezak |
| 4,471,804 A | 9/1984 | Bauer et al. |
| 4,561,494 A | 12/1985 | Frost |
| 4,669,532 A | 6/1987 | Tejima et al. |
| 4,871,013 A | 10/1989 | Nilsson et al. |

(Continued)

FOREIGN PATENT DOCUMENTS

CA        1005319        2/1977

(Continued)

OTHER PUBLICATIONS

U.S. Appl. No. 11/110,409 (Peric) entitled Tubular Flapper Valves filed Apr. 20, 2005.

(Continued)

*Primary Examiner*—John Rivell
*Assistant Examiner*—Craig Schneider
(74) *Attorney, Agent, or Firm*—Rideout & Maybee LLP

(57) ABSTRACT

A flapper valve assembly has a valve plate for attachment to a fluid device, such as a heat exchanger. The valve plate has a fluid port for permitting intermittent flow to or from a flow chamber in the fluid device. A resilient flapper covers the fluid port and has at least one transverse tab with resilient, laterally disposed tangs, so that the tabs snap into slots in the valve plate to prevent rotation of the flapper.

5 Claims, 11 Drawing Sheets

U.S. PATENT DOCUMENTS

| | | |
|---|---|---|
| 5,078,209 A | 1/1992 | Kerkman et al. |
| 5,146,980 A | 9/1992 | Le Gauyer |
| 5,174,504 A | 12/1992 | Halvorsen |
| 5,236,043 A | 8/1993 | Armbruster |
| 5,266,016 A | 11/1993 | Kandpal |
| 5,273,385 A | 12/1993 | Rose |
| 5,351,664 A | 10/1994 | Rotter et al. |
| 5,380,176 A | 1/1995 | Kikuchi et al. |
| 5,411,057 A | 5/1995 | Pouchot |
| 5,499,675 A | 3/1996 | Haasch et al. |
| 5,544,699 A | 8/1996 | Robers et al. |
| 5,558,346 A * | 9/1996 | Hartery ................ 220/787 |
| 5,575,329 A | 11/1996 | So et al. |
| 5,588,485 A | 12/1996 | Gire |
| 5,595,214 A | 1/1997 | Shaffer et al. |
| 5,609,476 A | 3/1997 | Kim et al. |
| 5,765,632 A | 6/1998 | Gire |
| 5,921,273 A | 7/1999 | Ono et al. |
| 5,950,589 A | 9/1999 | Armbruster |
| 6,139,291 A | 10/2000 | Perevozchikov |
| 6,293,774 B1 | 9/2001 | Brabek |
| 6,298,910 B1 | 10/2001 | Komoda et al. |
| 6,358,024 B1 | 3/2002 | Djordjevic |
| 6,382,305 B1 | 5/2002 | Sano |
| 6,412,514 B1 | 7/2002 | Raftis |
| 6,427,768 B2 | 8/2002 | Komoda et al. |
| 6,460,613 B2 | 10/2002 | Nash et al. |
| 6,461,126 B1 | 10/2002 | Pierobon |
| 6,471,490 B2 | 10/2002 | Kimura et al. |
| 6,814,133 B2 | 11/2004 | Yamaguchi |
| 6,942,472 B2 | 9/2005 | Sieberg |
| 2003/0019620 A1 | 1/2003 | Pineo et al. |
| 2006/0102240 A1 | 5/2006 | Spiegl et al. |

FOREIGN PATENT DOCUMENTS

| | | |
|---|---|---|
| CA | 1102210 | 6/1981 |
| CA | 1122968 | 5/1982 |
| GB | 1 545 710 | 5/1989 |
| WO | WO 2005/048890 | 6/2005 |

OTHER PUBLICATIONS

U.S. Appl. No. 11/110,434 (Cheadle et al) entitled Self-Riveting Flapper Valves filed Apr. 20, 2005.

U.S. Appl. No. 11/110,029 (Peric et al) entitled Slide-In Flapper Valves filed Apr. 20, 2005.

U.S. Appl. No. 11/110,433 (Peric) entitled Snap-In Flapper Valve Assembly filed Apr. 20, 2005.

U.S. Appl. No. 11/110,288 (Peric et al) entitled Snap-In Baffle Insert for Fluid Devices filed Apr. 20, 2005.

* cited by examiner

FLAPPER VALVES WITH SPRING TABS

FIELD OF THE INVENTION

This invention relates to valves, and in particular, to flapper valves.

BACKGROUND OF THE INVENTION

Automotive fluids, such as engine oil or transmission fluids, absorb heat in use. To prevent fluid deterioration, this heat often needs to be removed. Heat exchangers are commonly used for this purpose. Moreover, heat exchangers are known to perform this function adequately in moderate ambient conditions. However, in cold ambient conditions, engine oils and transmission fluids can be highly viscous. In such conditions, automotive fluids do not flow easily through heat exchangers. Starvation of some downstream components, like transmissions, may even occur. Further, fluid cooling by the heat exchanger when the fluid is already cold is undesirable, as it results in longer warm up time for the engine.

In order to avoid these adverse effects, it is known to provide a mechanism for bypassing the heat exchanger. One way that this has been done in the past is to provide a bypass conduit. The bypass conduit is connected in parallel with the heat exchanger and has a relatively low resistance to the flow of high viscosity fluids as compared to the heat exchanger. Structures of this type are known to avoid starvation of downstream components, but can suffer in that, in normal or warm operating conditions, the flow is split between the heat exchanger and the bypass circuit. This requires that the heat exchangers be made proportionately larger and heavier to achieve the same overall performance for the cooling system. This added size, and weight and the added costs associated therewith, are undesirable to automotive manufacturers.

To ameliorate the split-flow problem, it is known in the prior art to provide bypass valves. Usually, these bypass valves are pressure-activated and are integrally constructed with or attached to the heat exchanger. A heat exchanger exemplary of the foregoing is shown in U.S. Pat. No. 5,499,675 (Haasch et al.), issued Mar. 19, 1996. This structure includes a flapper valve of spring steel biased in a closed position, to arrest bypass flow, and which is adapted to be urged open when the flow resistance through the normal passages of the heat exchanger is too high, as in cold-start conditions. A similar structure is described in U.S. Pat. No. 4,360,055 (Frost), issued Nov. 23, 1982. Heat exchangers of this general type can avoid starvation of downstream lubricated components, and can be adapted such that bypass flow is substantially nil in normal operating conditions, thereby to permit compact heat exchanger construction. However, in Frost, connection of the flapper valve to the heat exchanger typically takes place while the heat exchanger is being mounted to the engine block, using an extension of the oil return pipe. This adds a step in assembly. Rather than simply mounting the oil cooler in place using the oil return pipe extension, the flapper valve must also be interposed. Further complicating assembly is the fact that the flapper valve, being constructed out of fairly lightweight material, is prone to suffering damage until installation, and thus, requires care in handling. Both factors add to assembly costs. In Haasch et al, the flapper valve is also rather delicate and exposed while the heat exchanger is being mounted to the engine block, using an extension of the oil return pipe. The flapper valve is prone to suffering damage or being dislodged during installation. Also, heat exchangers of the Frost and Haasch et al type cannot be modified easily to accommodate different mounting or performance requirements in modern automotive applications.

It is also known to provide heat exchangers including a domed filter plate and a snap-in valve clip. One such structure is described in U.S. Pat. No. 5,544,699 (Robers et al.), issued Aug. 13, 1996. While this structure avoids the loose part problem associated with Frost, special tools are required to install the valve clips, and it is relatively inflexible in use in that a domed filter plate must be utilized, so that it is limited to oil filters of relatively fixed dimensions.

SUMMARY OF THE INVENTION

In the present invention, a flapper valve assembly includes a flapper valve with transverse spring tabs that snap into slots in a valve plate that can be readily attached to a heat exchanger or other fluid device having a flow chamber from which intermittent flow is desired in response to a pressure differential across the flapper valve.

According to one aspect of the invention, there is provided a flapper valve assembly for use with a fluid device having a flow chamber with respect to which intermittent flow is desired. The flapper valve assembly comprises a valve plate having a fluid port area which defines a valve orifice therethrough for communication with the flow chamber. The fluid port area has opposed first and second sides, one of the sides includes a retaining area spaced from the valve orifice and adapted to be spaced from the fluid device. The fluid port area has at least one slot extending therethrough in the retaining area. A flexible flapper has a fixed end portion including at least one transverse tab adapted to pass through the slot, so that the flapper engages the fluid port area. The tab has resilient tangs that extend laterally therefrom and are disposed to engage the retaining area to prevent rotation of the flapper. The flapper further has a free end portion movable from a first position where the free end portion at least partially blocks flow through the valve orifice, to a second position where the free end portion unblocks the valve orifice. Bias means associated with the flapper is provided for urging the free end portion into the first position.

According to another aspect of the invention there is provided a heat exchanger comprising a heat exchange element including an inlet manifold, an outlet manifold, and flow passages therebetween for the passage of one heat exchange fluid through the heat exchange element. A valve plate is secured to the heat exchange element and has a fluid port area defining a valve orifice therethrough for communication with one of the inlet manifold and outlet manifold. The fluid port area has opposed first and second sides, one of the sides includes a retaining area spaced from the valve orifice and adapted to be spaced from structural components of the fluid device. The fluid port area has at least one slot extending therethrough in the retaining area. A flexible flapper has a fixed end portion including at least one transverse tab adapted to pass through the slot, so that the flapper engages the fluid port area. The tab has resilient tangs that extend laterally therefrom and are disposed to engage the retaining area and prevent rotation of the flapper. The flapper further has a free end portion movable from a first position where the free end portion at least partially blocks flow through the valve orifice, to a second position where the free end portion unblocks the valve orifice. Bias means associated with the flapper is provided for urging the free end portion into the first position.

Advantages, features and characteristics of the present invention, as well as methods of operation and functions of the related elements of the structure, and the combination of parts and economies of manufacture, will become apparent upon consideration of the following detailed description of the preferred embodiments of the invention, with reference to the accompanying drawings, in which:

DESCRIPTION OF THE PREFERRED EMBODIMENTS

Figure 1:
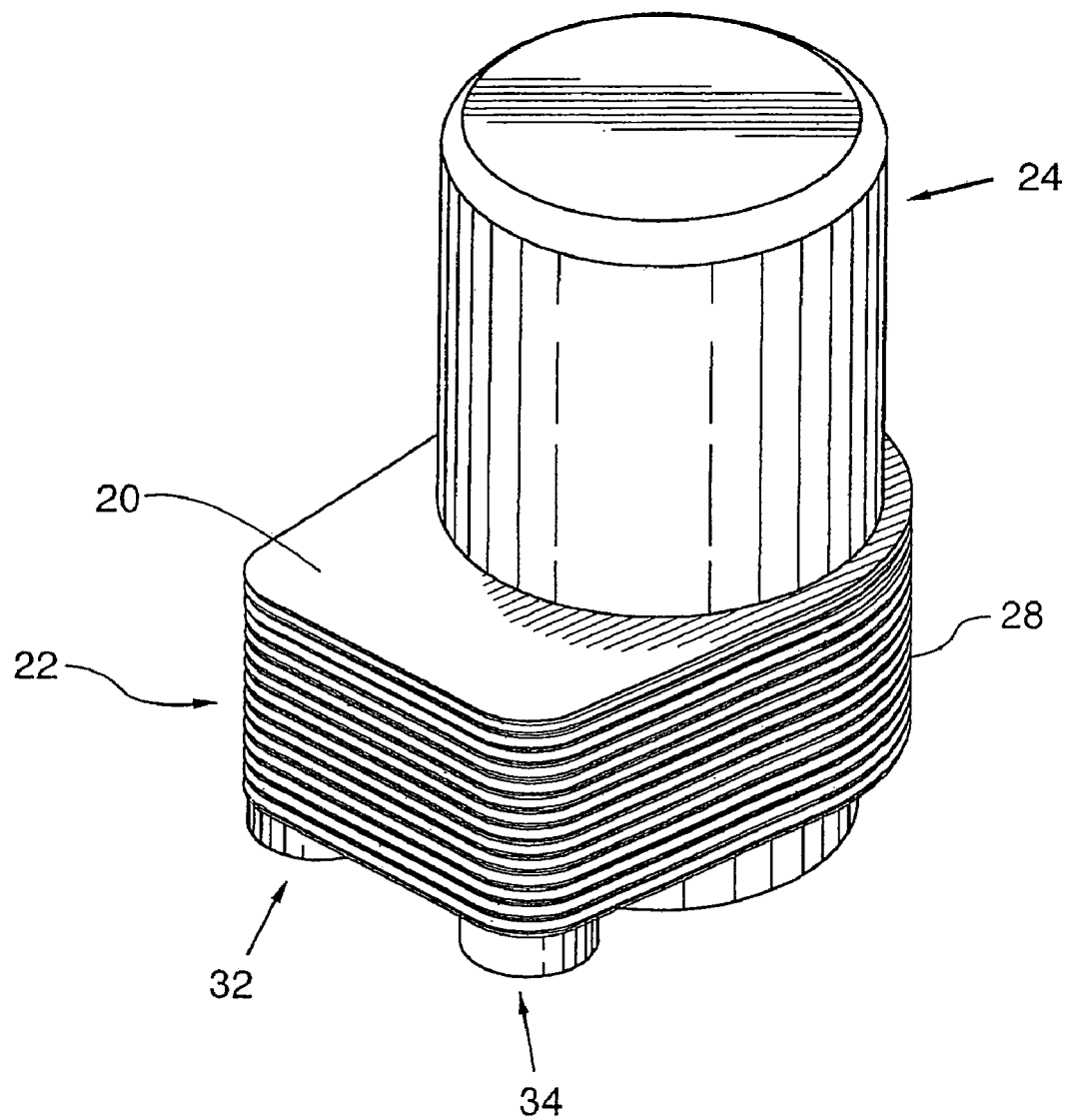
FIG. 1 is a perspective view of an assembly including a heat exchanger and a spin-on oil filter, the heat exchanger including a preferred embodiment of a flapper valve assembly according to the present invention.

FIG. 1 shows a heat exchanger 22 having a spin-on oil filter 24 or similar fluid device mounted thereon. Heat exchanger 22 includes a flapper valve assembly 20 according to a preferred embodiment of the present invention, and a heat exchange element 28. Heat exchanger 22 is preferably of the type sometimes referred to as a donut-type oil cooler, but it could be any other type of heat exchanger.

Figure 2:
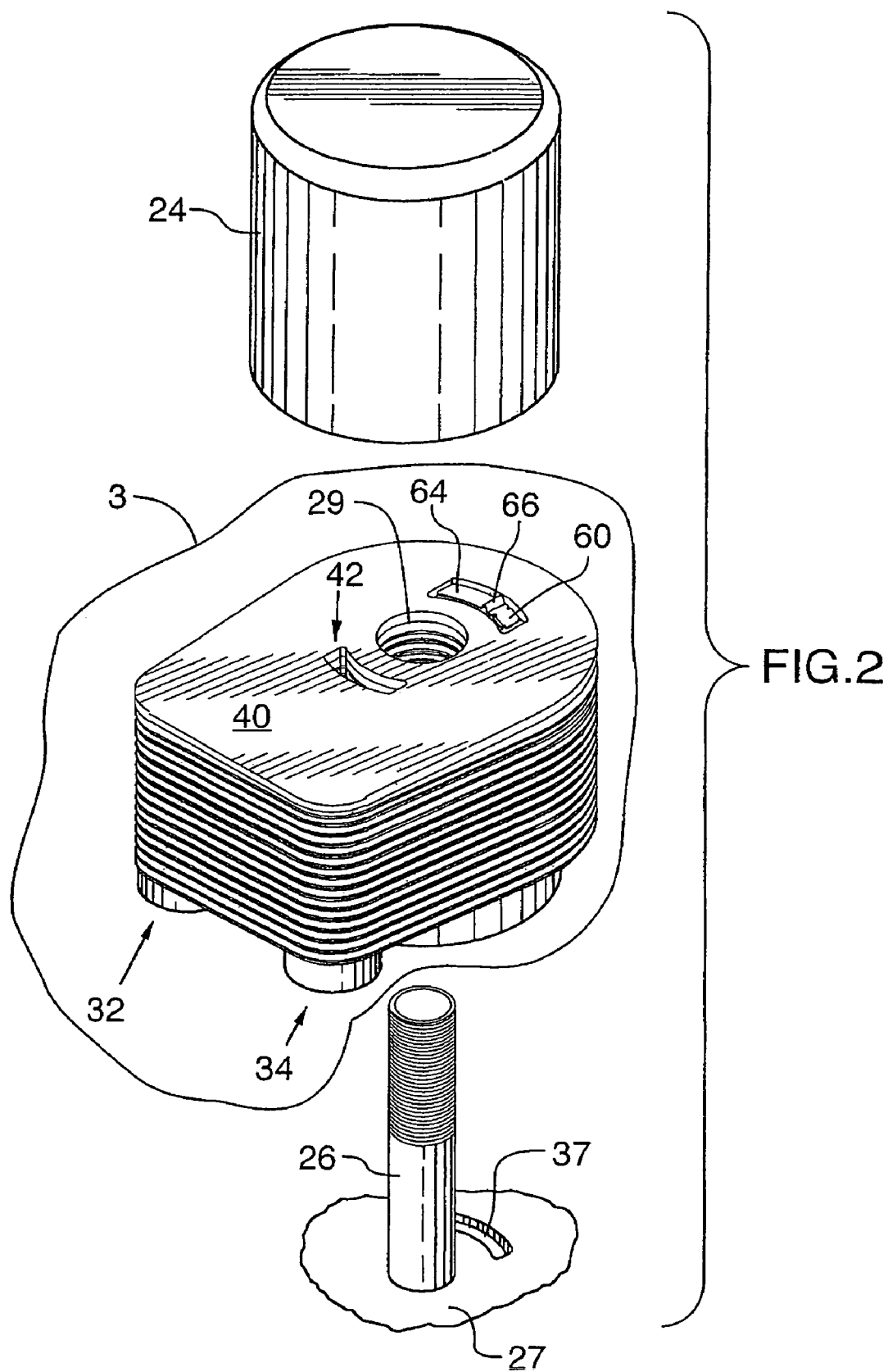
FIG. 2 is an exploded view of the structure of FIG. 1 about to be mounted on an engine block.

The donut cooler or heat exchanger 22 is for use with a coolant circuit and a lubrication or other fluid circuit and, by way of example, as indicated in FIG. 2, is mounted on a threaded pipe 26 attached to an engine block 27. Threaded pipe 26 extends through an opening 29 in heat exchanger 22 to permit the subsequent threaded mounting of oil filter 24 onto pipe 26, as indicated in FIG. 1. This also holds heat exchanger 22 in place.

Figure 3:
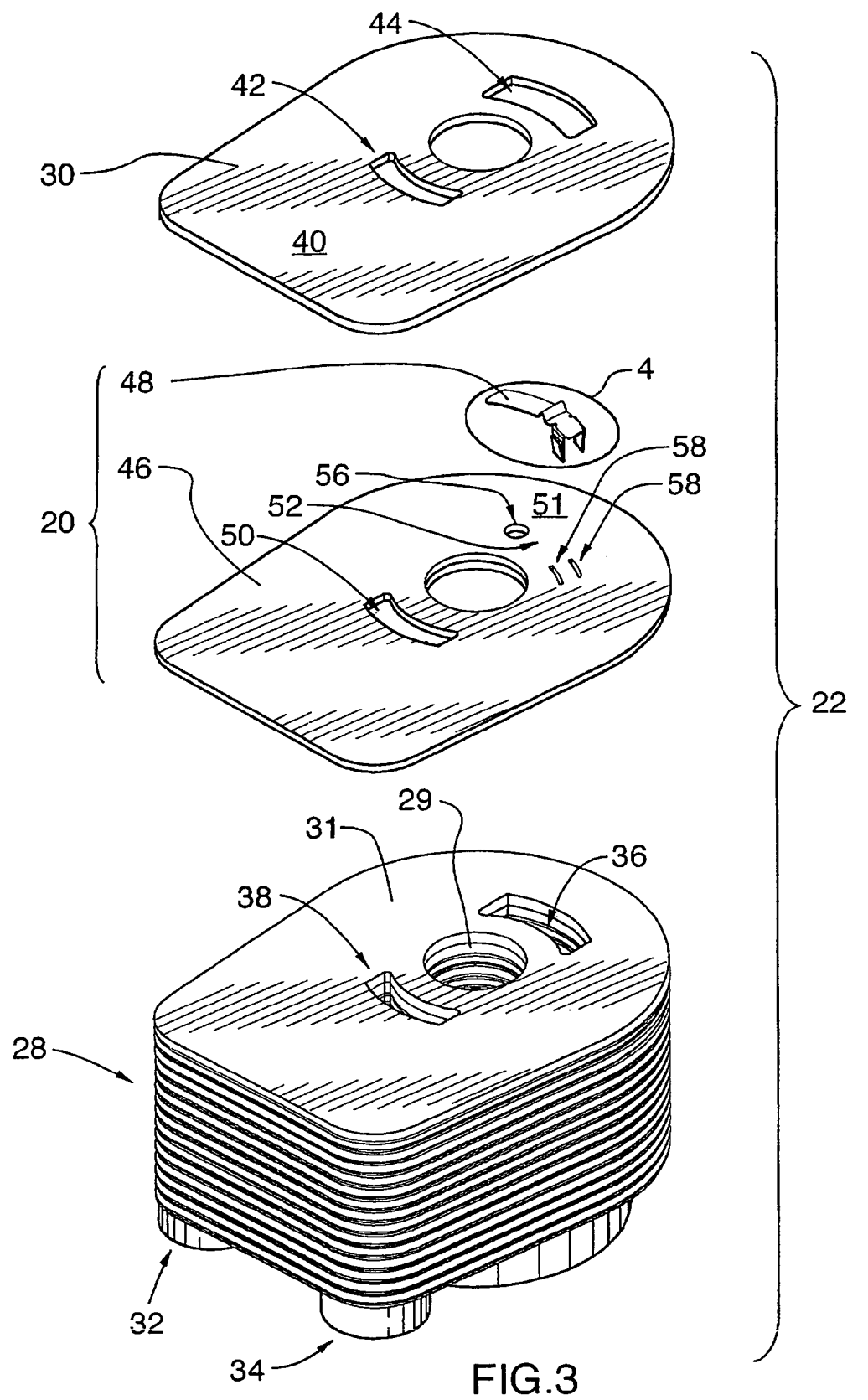
FIG. 3 is an exploded view of the structure in encircled area 3 in FIG. 2.

As best seen in FIG. 3, heat exchange element 28 has an end plate 31. Heat exchanger 22 also includes a face plate 30, and a flapper valve assembly 20 located between face plate 30 and end plate 31. Heat exchange element 28 is of the stacked plate-type and has a coolant inlet 32 and a coolant outlet 34. Heat exchange element 28 is formed of a plurality of aluminum plates brazed together. Each plate has spaced-apart, arcuate openings therein, which are aligned to form respective flow passages or chambers or manifolds 36, 38. One of these manifolds can be an inlet manifold, for example, manifold 36. The other of them can be an outlet manifold 38, but this flow direction could be reversed.

Where manifold 36 is the inlet manifold, oil is received into the manifold 36 from an aperture 37 formed in engine block 27 (see FIG. 2). This oil passes through heat exchange element 28 to outlet manifold 38, and then passes upwardly into oil filter 24, and finally down through pipe 26 to be returned to engine block 27. However, where this flow is reversed, it comes up through pipe 26 to filter 24, and then passes through manifold 38 to manifold 36 and then back through aperture 37 to be returned to the engine.

It should be understood that the heat exchange element 28 is of generally conventional construction, and therefore, only those parts necessary for an understanding of the present invention are shown in the figures and described herein. For the purposes of the present specification, the exact form of the heat exchanger element 28 and the spin-on oil filter 24 is not considered to be part of the present invention.

Upon a flow of heated oil being forced into the inlet manifold 36 and a flow of coolant being delivered to the coolant inlet 32, a flow of cooled oil is produced at the outlet manifold 38 and a flow of heated coolant is produced at the coolant outlet 34.

The face plate 30 has a sealing surface 40 and a pair of openings 42, 44. The sealing surface 40 is adapted to be engaged by the filter 24 and as such, may be referred to as the filter side of face plate 30. The pair of openings 42, 44 communicate with an annular channel (not shown) in the base of the oil filter 24. One of this pair of openings, namely opening 42, is in fluid communication with the flow manifold 38 for receiving the flow of cooled oil. The other opening 44 permits by-pass flow to the oil filter 24, as described further below.

Turning now to the flapper valve assembly 20, same will be seen to comprise a valve plate 46 and a flexible flapper 48. The valve plate 46, which is constructed of stamped aluminum is disposed between and secured, by brazing, to each of end plate 31 and face plate 30. Valve plate 46 has an aperture 50 communicating with manifold 38 and face plate opening 42. Valve plate 46 also has a fluid port area 52 which defines an opening or fluid port or valve orifice 56 extending between the manifold 36 and face plate opening 44. Fluid port area 52 has a first or top side 51, and an opposed second or bottom side 53 (see FIG. 6). One of these sides 51, 53 includes a retaining area 54 spaced from valve orifice 56. Fluid port area 52 includes a pair of spaced-apart internal holes or slots 58 extending therethrough in the retaining area 54. For clarity, fluid port area 52 should be understood to be the portion of the valve plate 46 immediately surrounding valve orifice 56 and retaining area 54. Fluid port area 52 is about the same size or smaller in area than the cross-sectional area of manifold 36.

Figure 4:
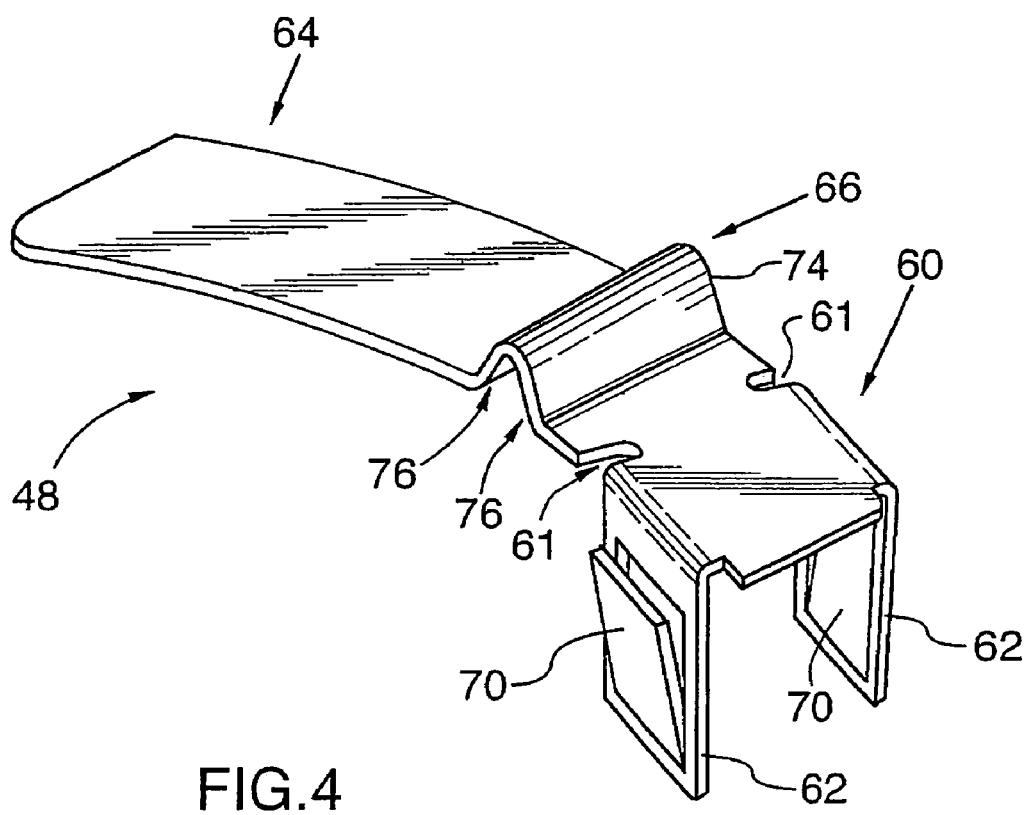
FIG. 4 is an enlarged view of the structure in encircled area 4 in FIG. 3.
Figure 5:
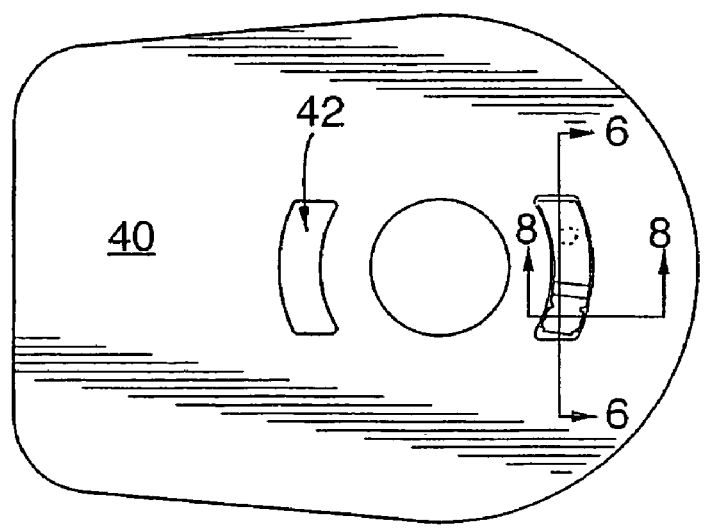
FIG. 5 is a top plan view of the structure in encircled area 3 in FIG. 2.

The flapper 48 is disposed within the face plate opening 44 when face plate 30 is attached to valve plate 46, such that the opening 44 circumscribes the flapper 48. The flapper 48 is preferably stamped from a strip of spring material, namely, spring steel, and has, as best illustrated in FIG. 4, a fixed end portion 60 including a pair of transverse, spaced-apart tabs 62 adapted to be located in slots 58. Flapper 48 also has a free end portion 64 and a resilient intermediate portion 66 located between the fixed end portion 60 and the free end portion 64, as will be described further below.

Each tab 62 is substantially planar and is associated with a respective slot 58 and has, as best seen in FIG. 4, a substantially planar tang 70. The tabs 62 extend substantially transversely or perpendicularly from the fixed end portion 60 as shown in FIG. 8, and are rigidly connected to the fixed end portion 60, and more specifically, are part of or formed integrally therewith, along with tangs 70.

The tangs 70 are disposed at an unsprung position whereat they extend laterally or in an angled relation to engage the fluid port area 52 of valve plate 46. Actually, tangs 70 engage the retaining area 54 (see FIGS. 6 and 7) of fluid port area 52. Retaining area 54 is on the second or bottom side 53 of fluid port area 52, but it could be on the first or top side 51, if it is desired to locate flapper 48 on the underside of valve plate 46, so that it opens downwardly or inwardly into flow manifold 36. This downward or inward orientation would be used when the oil flow direction is reversed, so that it goes through filter 24 before going through heat exchange element 28, as mentioned above. In either case, retaining area 54 is adapted to be spaced from structural components of fluid device or heat exchange element 28 to provide clearance for tabs 62. Tangs 70 adapt the tabs 62 to resist extraction from slots 58, and thus, securely mount the fixed end portion 60 of flapper 48 to the plate 46.

Figure 8:
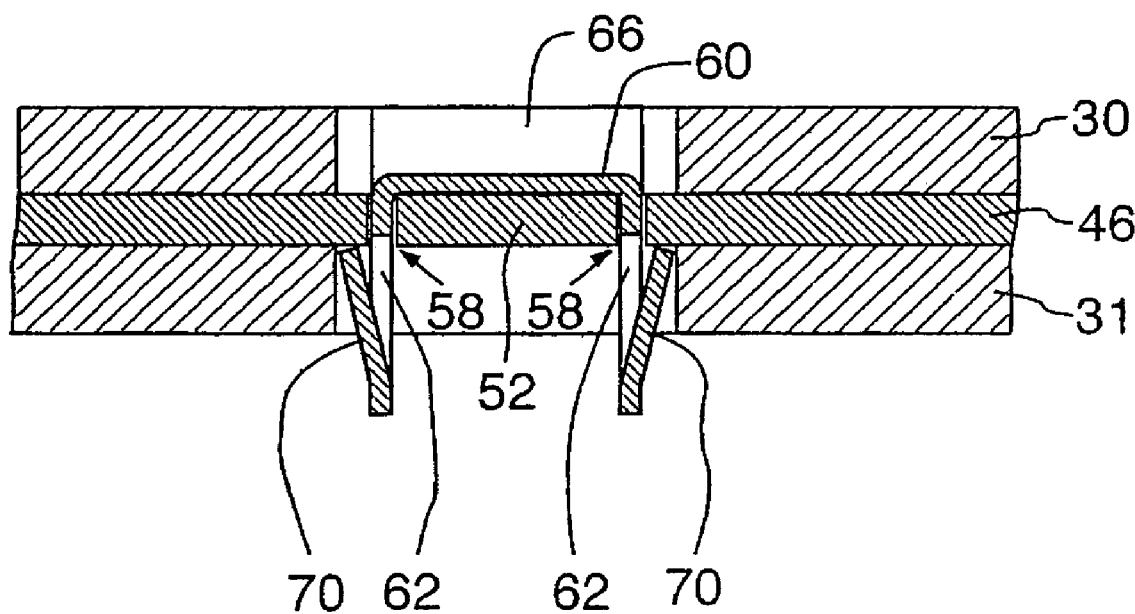
FIG. 8 is a partial cross-sectional view taken along lines 8-8 of FIG. 5.
Figure 9:
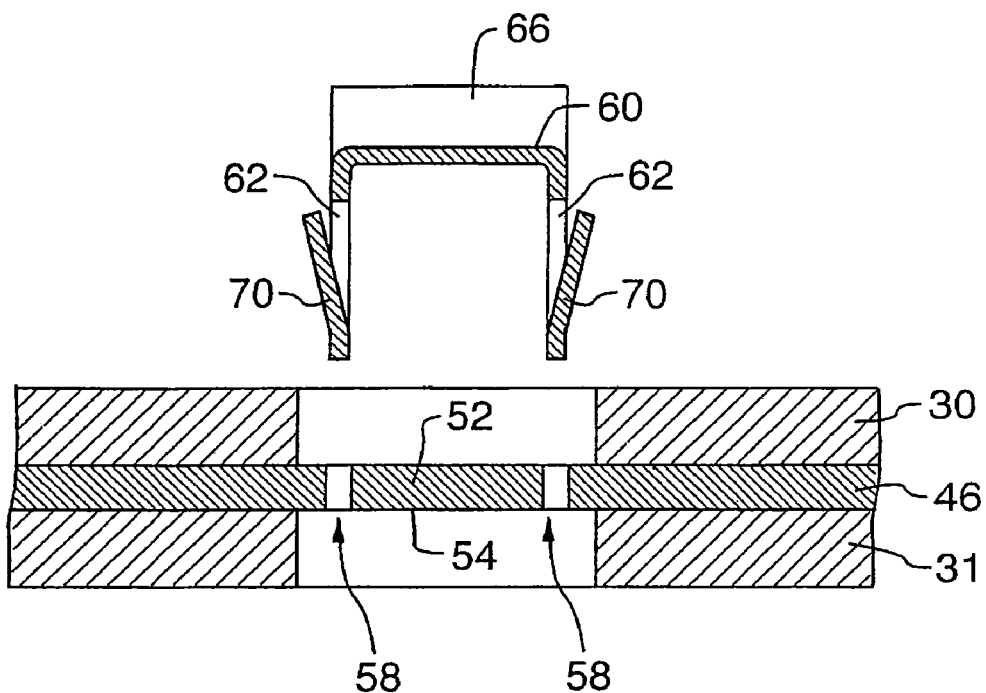
FIG. 9 is a view similar to FIG. 8, showing the flapper apart from the valve plate with the tangs shown at their unsprung positions.
Figure 10:
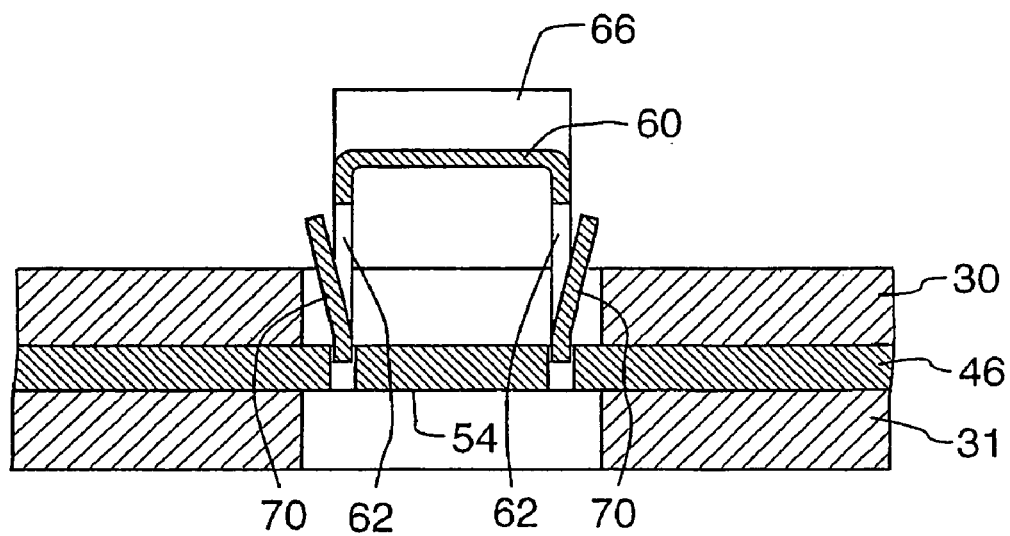
FIG. 10 is a view similar to FIG. 9, showing the tabs of the flapper engaging the slots of the valve plate.
Figure 11:
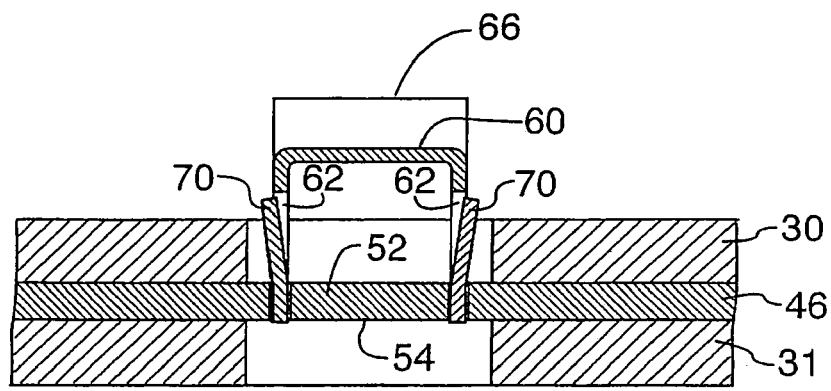
FIG. 11 is a view similar to FIG. 10, showing the tabs relatively further disposed into the slots.
Figure 12:
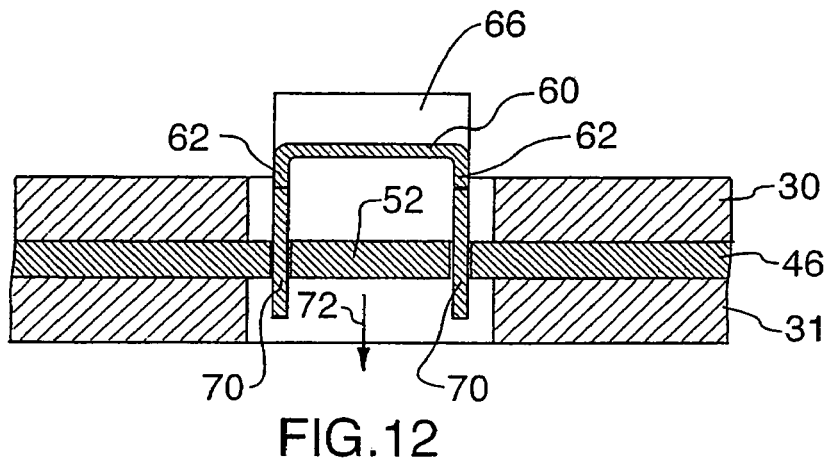
FIG. 12 is a view similar to FIG. 11, showing the tabs relatively further disposed into the slots, with their respective tangs disposed at their sprung positions.
Figure 13:
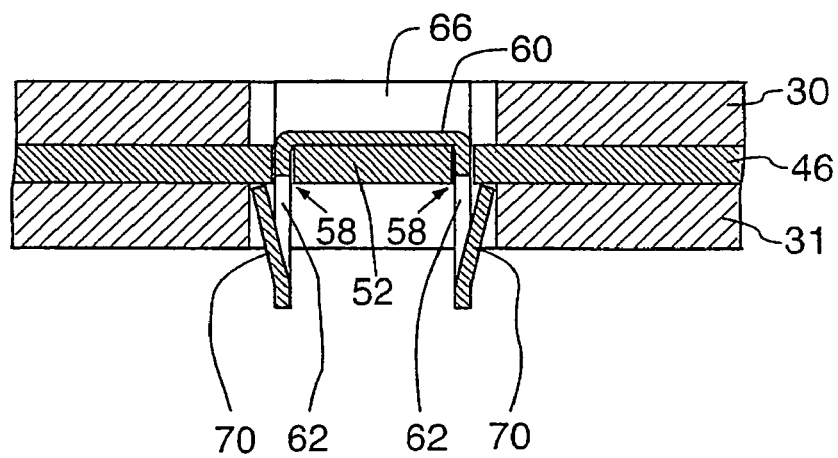
FIG. 13 is a view similar to FIG. 8.

In addition to the unsprung position shown in FIGS. 4 and 8, tangs 70 have a sprung position, shown in FIG. 12, whereat they extend, in coplanar relation to the tabs 62. This adapts the tabs 62 for insertion and removal from the slots 58, as indicated in FIG. 12, wherein arrow 72 shows the direction of insertion. In the preferred embodiment, the tangs 70 are resiliently movable from the unsprung position to the sprung position in a manner which permits the tabs 62 to be conveniently inserted into their associated slots 58 merely by engaging the projecting ends of the tabs 62 into the slots 58, as shown in FIG. 10, and applying finger pressure to the fixed end portion 60 of the flapper 48, whereupon the slots 58 urge the tangs 70 to the sprung positions, as shown by the sequence of FIGS. 9, 10, 11, 12. Once the valve plate 46 has been cleared, tangs 70 spring back to their respective unsprung positions, and the tabs snap into place, as indicated by the sequence of FIGS. 12, 13, to lock the flapper 48 in place.

Figure 14:
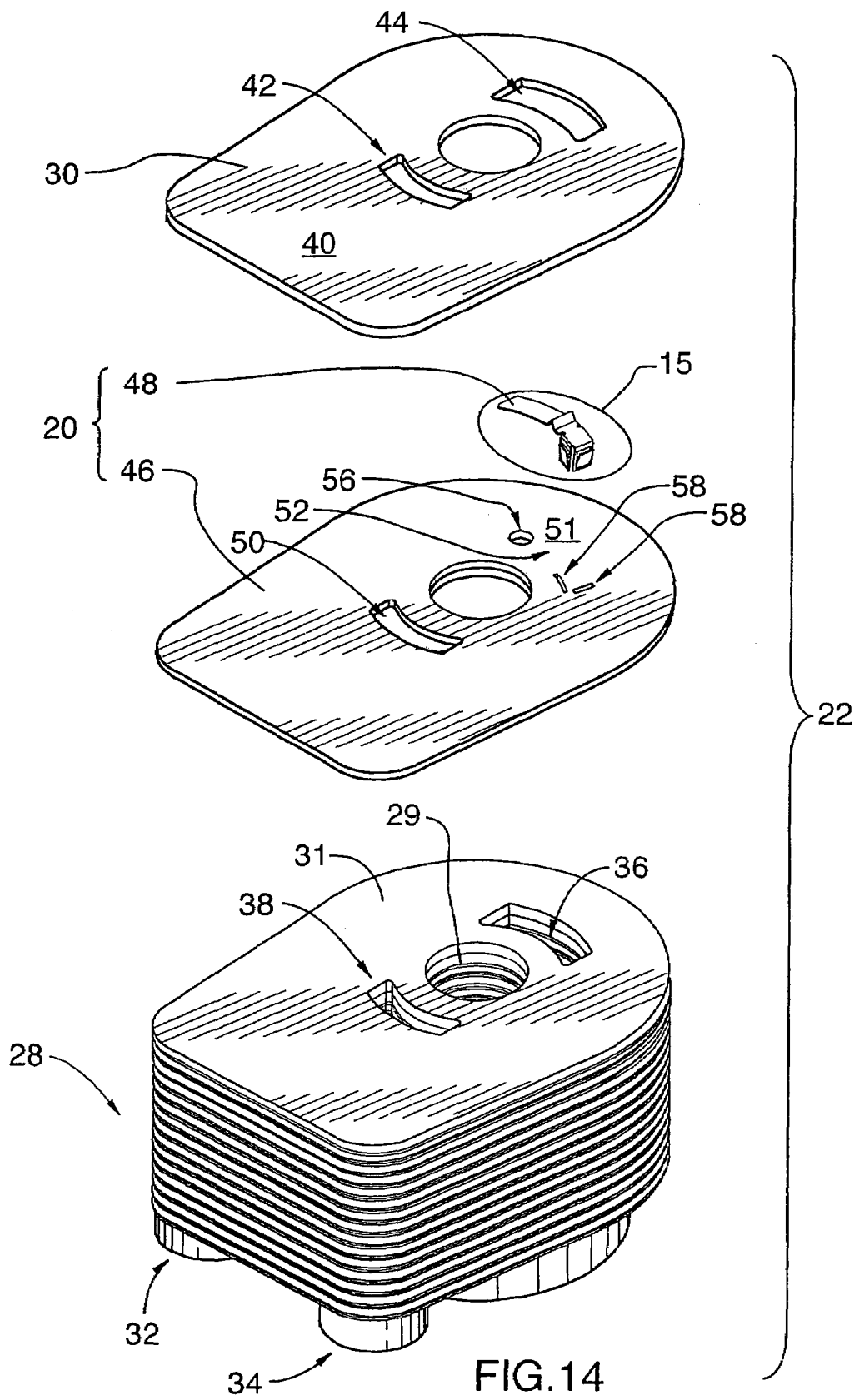
FIG. 14 is a view, similar to FIG. 3, showing a further preferred embodiment of the invention.
Figure 15:
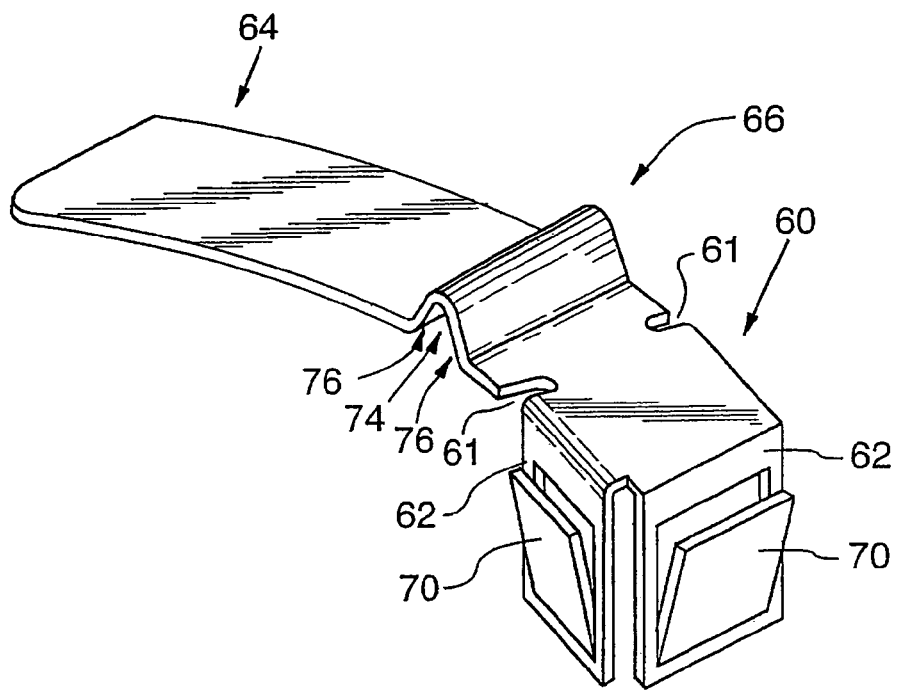
FIG. 15 is an enlarged perspective view of the structure in encircled area 15 in FIG. 14.
Figure 16:
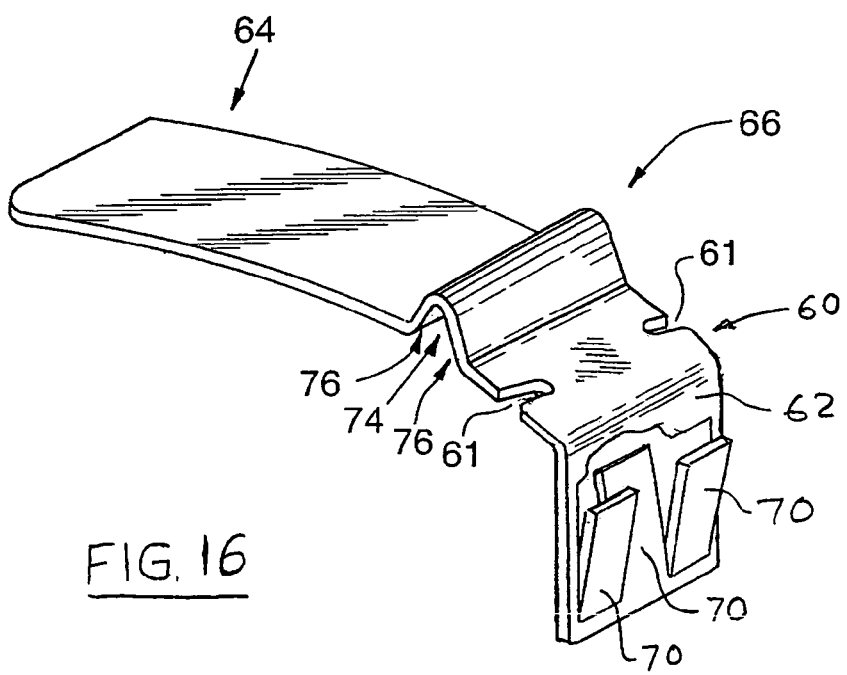
FIG. 16 is a perspective view similar to FIG. 15, but showing yet another preferred embodiment of a flapper according to the invention.
Figure 17:
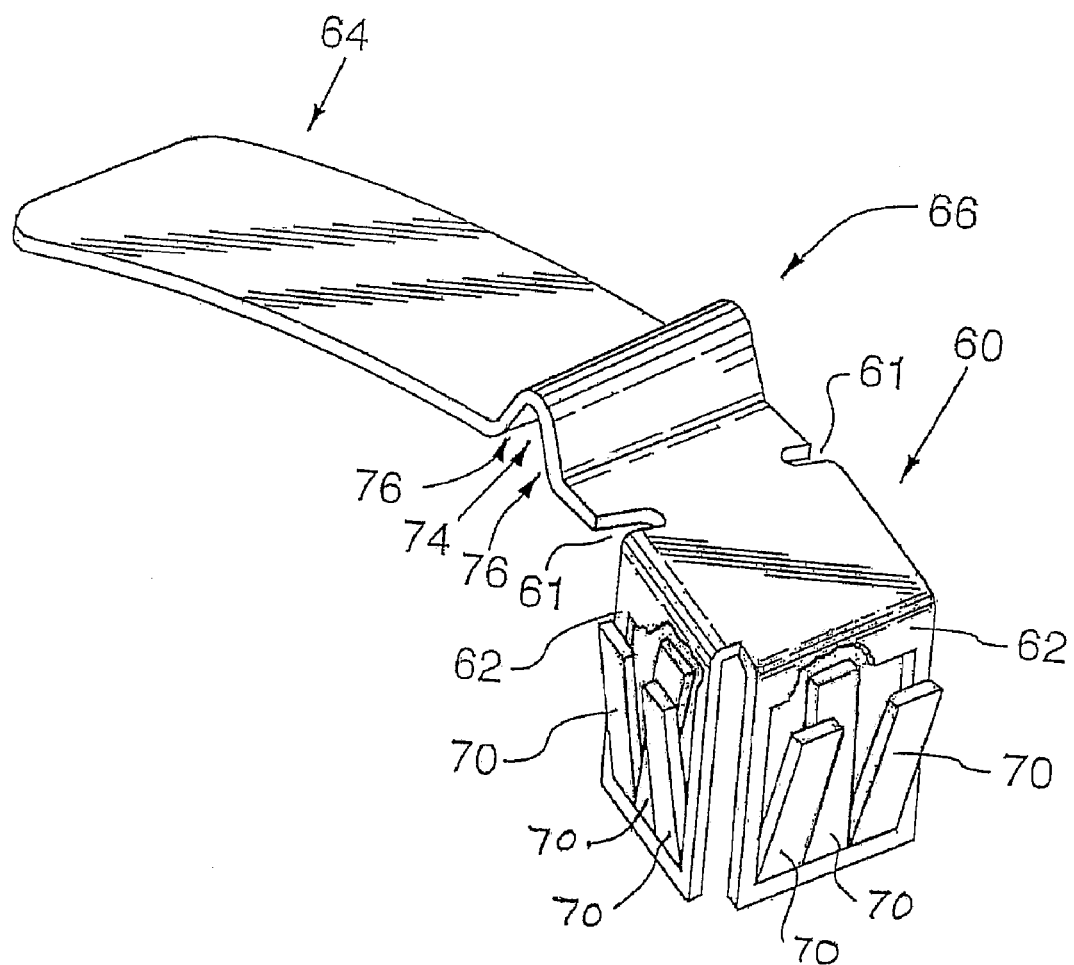
FIG. 17 is a perspective view similar to FIG. 15 but showing yet another preferred embodiment of a flapper according to the invention.

In the preferred embodiment shown in FIGS. 1-13, the tabs 62 are arranged parallel to one another. Tangs 70 extend outwardly or away from one another, but they could also extend inwardly toward one another. In a further preferred embodiment shown in FIGS. 14 and 15, the tabs 62 are disposed in angled, and more specifically, perpendicular or normal relation to one another. Other arrangements of the tabs are possible, as long as horizontal and vertical rotation of flapper fixed end portion 60 is avoided. In fact, a single tab 62 could be used, as indicated in FIG. 16, with tangs 70 extending laterally therefrom on either side of the tab. In this case, there would only be one slot 58 in valve plate 46. Further, there could be one or more tangs 70 extending from each side of each tab as indicated in FIG. 17.

Figure 6:
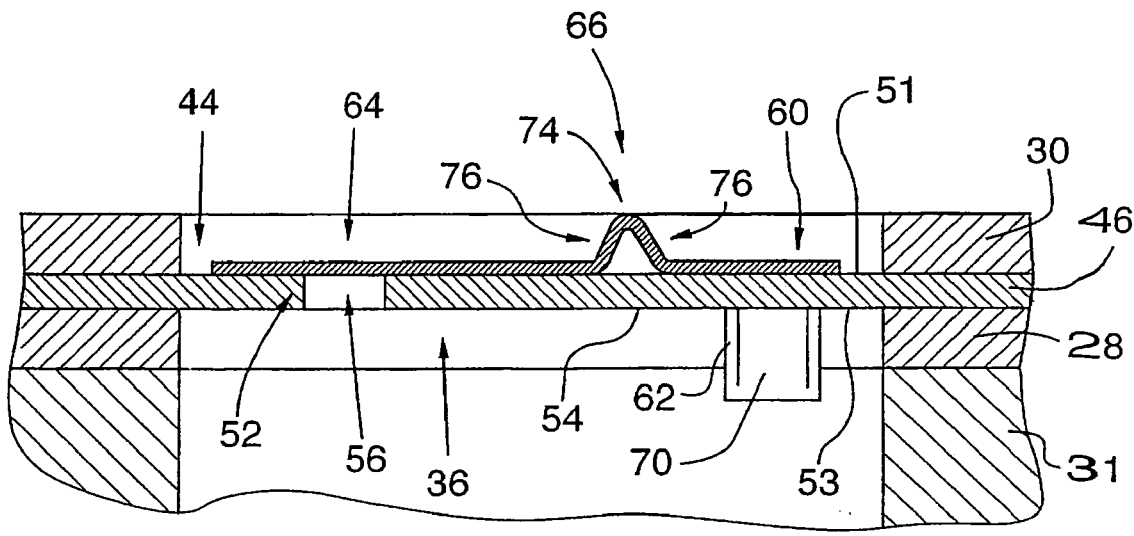
FIG. 6 is a partial cross-sectional view taken along lines 6-6 of FIG. 5, with the free end portion of the flapper shown in the closed position.
Figure 7:
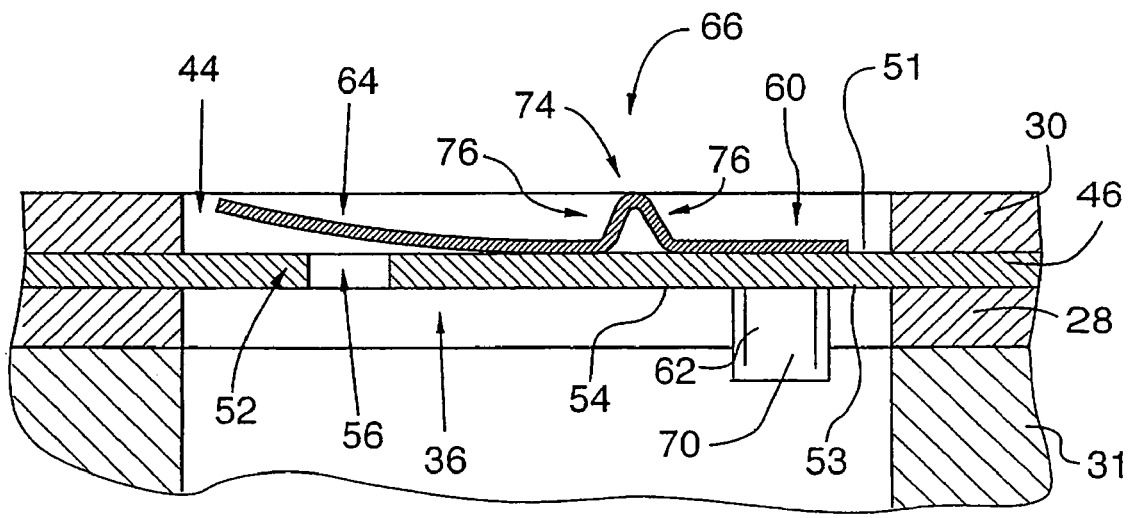
FIG. 7 is a view similar to FIG. 6, with the free end portion of the flapper shown in the open position.

The free end portion 64 of the flapper 48 is movable, by flexure of the intermediate portion 66, between a first or closed position, abutting the fluid port area 52 in overlying relation to the valve orifice 56 as shown in FIG. 6, and a second or open position, apart from the fluid port area 52 as shown in FIG. 7. Notches 61 (see FIG. 4) formed in flapper 48 facilitate this flexure. At the open position, the spacing between the free end portion 64 and the fluid port area 52 provides for communication between the face plate opening or outlet 44 and the inlet manifold or flow chamber 36. The dimensions of the free end portion 64 are such that flow through valve orifice 56 is restricted, and more specifically, substantially arrested, when it is disposed at its closed position. However, free end portion 64 could be dimensioned only to partially cover valve orifice 56 to give some permanent by-pass flow, if desired.

The intermediate portion 66 of flapper 48 includes a corrugation or crest 74 formed in the strip of spring material. Corrugation 74 has a pair of walls 76,76 resiliently coupled to one another to resist separation from one another. This structure provides a spring-tension such that, at its closed position, the free end portion 64 of the flapper 48 is urged against the fluid port area 52.

As mentioned above, in use, the heat exchanger 22 is mounted on an engine between the engine block 27 and a conventional oil filter 24. In normal operating conditions, wherein relatively warm, substantially free-flowing oil is delivered to the inlet manifold 36, bias provided by the intermediate portion 66 maintains the free end portion 64 of the flapper 48 in a closed position against the fluid port area 52 to restrict, and more specifically, substantially arrest bypass flow through the valve orifice 56. Thus, most of the flow arriving at the inlet manifold 36 passes in heat exchanging relation through the heat exchange element 28 to the outlet manifold 38, transferring heat in the process, prior to passing through outlet 42 in the face plate 30 to the oil filter 24, for filtering, and subsequent return to the oil circuit through oil return pipe 26.

In contrast, in conditions such as are present in the context of an engine start in relatively cold ambient conditions, wherein the oil is relatively cold, viscous oil is delivered to the inlet manifold 36. In these circumstances, the flow resistance through the heat exchange element 28 is relatively high, with the result that the viscous oil forces the free end portion 64 of the flapper 48 into an open position spaced from the fluid port area 52, as indicated by the sequence of FIGS. 6 and 7 such that flow passes from the inlet manifold 36 through opening or outlet 44 directly to the filter 24. Periodic, momentary high pressure bursts or spikes also bypass the heat exchange element 28 in this manner, if the heat exchanger 22 encounters transient high pressure spikes in the oil circuit.

The mechanical properties of flapper valve assembly 20 are selected to suit the operating parameters of the heat exchange element and lubrication circuit with which it is used; and in particular, flapper 48 has a spring constant such that it will open under predetermined pressure conditions.

The foregoing structure is of particular advantage, in that it obtains relatively high cooling performance in normal operating conditions, when cooling is needed, as substantially all oil passes through the heat exchange element to transfer its heat to the engine coolant in such conditions. At the same time, the structure avoids starvation of mechanical components in high pressure conditions, such as cold weather startup, and also avoids metal fatigue that can result from pressure spikes in the thin-wall plates forming the heat exchanger, since in such conditions bypass flow occurs.

Having described preferred embodiments of the present invention, it will be appreciated that various modifications may be made to the structures described above without departing from the spirit or scope of the invention.

Foremost, whereas the flapper valve assembly of the preferred embodiment is shown in use with a heat exchanger, it should be understood that the invention is not so limited, and may be deployed in association with any fluid device having a flow chamber from which intermittent flow is desired.

It should also be understood that whereas the disclosure illustrates and describes a heat exchanger of specific construction, modifications therein are also contemplated to fall within the scope of the invention.

Heat exchangers, for example, that are not of the donut type may be utilized. As well, the heat exchangers need not be formed of stacked plates, nor is it required that all or any of the various components be brazed to one another. The plates forming the heat exchanger could, for example, be brazed to one another, and the valve plate secured thereto by an adhesive, such as epoxy.

It will also be appreciated that flapper valve assembly 20 can be located at any position relative to the fluid device, and that orientation of flapper 48 could be reversed, so that it is located on the underside of valve plate 46 rather than on the top side as illustrated.

As a further modification, whereas the flapper of the preferred embodiment consists of a strip of simple spring steel, a resilient bimetallic strip could be readily substituted therefor, to tune the amount of bias provided according to different temperatures. For example, a bimetallic flapper could open in cold conditions to give bypass flow even if the pressure was not excessive, and close in warm conditions to give pressure relief as needed. Of course, a bimetallic flapper would still have a flexible intermediate portion and provide pressure spike protection even in warm flow conditions.

As well, whereas the flapper intermediate portion of the preferred embodiment is provided with a corrugation to augment the spring-tension urging the second portion of the flapper against the fluid port area at the closed position, this need not be the case. The corrugation could, for example, merely bias the free end portion of the flapper for movement to its closed position. As well, the corrugation could be omitted and the flapper could be constructed out of a material which would be sufficiently resilient to close the valve orifice without the presence of a corrugation.

It should also be noted that whereas in the preferred embodiments illustrated, the flapper intermediate portion, that is, the portion of the flapper that extends between the fixed end portion and the free end portion is elongate, this need not be the case. For example, the intermediate portion could take the form of a resilient living hinge connecting the first portion and the second portion.

Further, whereas the free end portion of the flapper illustrated in each of the preferred embodiments is substantially planar, it will be evident that any form of protuberance could be formed on the free end portion to fit, in whole or in part, in any form of fluid port or valve orifice.

As well, the construction of the flapper free end portion need not be limited to the spring material of which the remainder of the flapper is constructed. Also, coatings could, for example, be applied to assist in sealing.

As well, whereas the free end portion has been herein described as being movable between the open position and the closed position by flexure of the intermediate portion, this flexure may only be one component of the movement, and the free end portion itself may undergo flexure.

From the foregoing, it will be evident to persons of ordinary skill in the art that the scope of the present invention is limited only by the accompanying claims, purposively construed.

The invention claimed is:

1. A flapper valve assembly for use with a fluid device having a flow chamber with respect to which intermittent flow is desired, the flapper valve assembly comprising: a valve plate having a fluid port area defining a valve orifice therethrough for communication with said flow chamber, the fluid port area having opposed first and second sides, one of said sides including a retaining area spaced from the valve orifice and adapted to be spaced from the fluid device; the fluid port area having at least one slot extending therethrough in the retaining area; a flexible flapper having a fixed end portion including at least one transverse tab adapted to pass through said slot, so that the flapper engages the fluid port area, said tab having multiple resilient tangs extending laterally on either side of the tab and disposed to engage the retaining area to prevent rotation of the flapper; the flapper having a free end portion movable from a first position where the free end portion at least partially blocks flow through the valve orifice, to a second position where the free end portion unblocks the valve orifice; and bias means associated with the flapper for urging the free end portion into the first portion.

2. A flapper valve assembly according to claim 1 wherein each tab is substantially planar and wherein each tab has a substantially planar tang, said tang being disposed between an unsprung position whereat it extends in angled relation from the tab to engage the valve plate retaining area adjacent the slot associated with said tab, and a sprung position whereat it extends, in coplanar relation to the tab to permit said each tab to be inserted in its associated slot.

3. A flapper valve assembly according to claim 1 wherein the flapper free end portion is dimensioned to substantially arrest flow through the valve orifice when in the first position.

4. A flapper valve assembly according to claim 1 wherein the flapper is formed from spring material.

5. A flapper valve assembly according to claim 1 wherein the flapper further comprises an intermediate portion located between the fixed end portion and the free end portion, the intermediate portion having a corrugation formed therein, said corrugation having a pair of resilient walls to resist separation from one another.

* * * * *